United States Patent Office 3,736,283
Patented May 29, 1973

3,736,283
WATER-BASED ADHESIVE FROM VINYL ACETATE-ETHYLENE COPOLYMER EMULSION CONTAINING MERCAPTO ALKYL SILANE
Howard H. Taylor, Jr., Wilmington, Del., assignor to Hercules Incorporated, Wilmington, Del.
No Drawing. Filed Dec. 28, 1970, Ser. No. 102,164
Int. Cl. C08f 45/24
U.S. Cl. 260—29.6 MQ    2 Claims

ABSTRACT OF THE DISCLOSURE

Water-based adhesive compositions of a latex emulsion of a copolymer of ethylene and vinyl acetate are described. The compositions have increased adhesion to plastics, metals, textile, paper, etc. and comprise a latex emulsion of a copolymer of ethylene and vinyl acetate containing from 5 to 40 weight percent ethylene and, by weight of the composition from 0.05 to 2% of a mercapto silane which is preferably a mercaptoalkyl trialkoxysilane.

---

This invention relates to water-based adhesives suitable for bonding plastics, metals, cellulosic materials, fabrics, minerals, glass, wood and the like and more particularly to adhesives based on emulsions of a copolymer of ethylene and vinyl acetate.

Latices or emulsions of copolymers of ethylene and vinyl acetate having a low ethylene content are known. Such latices, however, are not suitable for many applications because they do not adhere firmly to the substrates to which they are applied. Attempts to improve the bonding strength of such latices by modifying the copolymer have been successful to some extent. However, the modifications are relatively complex and expensive and hence detract from any cost advantages realized through the use of latices. Moreover, such latices do not provide adequate adhesion with all types of substrates and particularly with plastics such as the polyolefins and polyamides.

In accordance with the present invention there is provided a water-based adhesive which is based on copolymer latices of ethylene and vinyl acetate and which is suitable for bonding plastics, metals, textiles, paper, wood, and like to similar or dissimilar materials. The invention also provides an adhesive of a latex emulsion of a copolymer of ethylene and vinyl acetate having increased adhesion to plastics.

Accordingly, the present invention relates to a water-based adhesive composition comprising a latex emulsion and from 0.05 to 2% by weight of the composition of a mercaptosilane having the formula $R_3SiZ$ wherein at least one R is a mercapto-substituted organic radical attached to silicon through a Si—C linkage and the other R's are alkyl, aralkyl, alkaryl, alkoxy, aryloxy, cycloalkoxy, aralkoxy, alkanoyloxy or halo groups and Z is

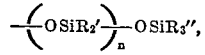

alkoxy, aryloxy, cycloalkoxy, aralkoxy, alkanoyloxy or halo groups where R' is hydrogen, hydrocarbon or a substituted hydrocarbon group nonreactive with the silane, at least one R" is an alkoxy, aryloxy, cycloalkoxy, aralkoxy, alkanoyloxy or halo group and the remaining R"s are the same or a mercapto-substituted organic radical attached to silicon through Si—C linkage, alkyl, aralkyl or alkaryl groups and n is 0 to 20, said emulsion comprising a copolymer of ethylene and vinyl acetate containing from 5 to 40 weight percent ethylene. The invention further relates to the use of the adhesive composition to unite similar or dissimilar substrates and to laminated structures, for example, plastic, paper, wood, etc. structures wherein the respective laminae are adhered together by the water-based adhesive.

The adhesive compositions of this invention can be made by preparing a latex emulsion of the copolymer of ethylene and vinyl acetate and then adding to the emulsion the desired amount of the mercaptosilane, preferably with agitation. Other agents may be present in or added to the composition as for example, dyes and pigments, fillers, thickening agents, stabilizers, surfactants and the like. Thus, in addition to the mercaptosilane the composition can also contain coloring agents, hydroxyethyl cellulose, talc, calcium carbonate and the like. If present, such agents will usually range in amounts from 0 to 50% providing, of course, such amounts do not interfere with the advantages realized by the present invention.

As stated, the copolymers of the emulsion are copolymers of ethylene and vinyl acetate containing from 5 to 40 weight percent ethylene and preferably from 16 to 40% ethylene. Such copolymers are known and are readily prepared in latex form by copolymerizing vinyl acetate and ethylene in an aqueous dispersion system. The copolymerization is usually carried out under pressures not exceeding 100 atmospheres in the presence of a catalyst and at least one emulsifying agent, the aqueous system being maintained by a suitable buffering agent at a pH of 2 to 6. Free-radical forming catalysts or redox catalyst systems can be used and the emulsifying agent is usually of the nonionic type. Latex stabilizers such as ethylenically unsaturated acid having up to 6 carbon atoms, and protective colloids such as hydroxyethyl cellulose, polyvinyl alcohol, casein, hydroxyethyl starch, carboxymethyl cellulose and the like, as known in the art of synthetic polymer later technology, can also be present. The latices of the present invention preferably are characterized by containing copolymers having an intrinsic viscosity of 1 to 2.5 dl./g. and an average particle size of 0.1 to $2\mu$ and preferably 0.1 to $0.25\mu$. Most preferably the latices have a high solids content, usually within the range of 30 to 70% and preferably from 45 to 55%. The copolymers can also contain, if desired, a small amount, preferably up to 10%, of other comonomers such as for example glycidyl acrylate, allyl glycidylether, triallylcyanurate, N-methylo acrylamide, and the like. Thus the preferred copolymers contain from 5 to 40% of ethylene, from 60 to 95% of vinyl acetate and from 0 to 10% of other comonomer.

As stated, the adhesive compositions of the invention contain from 0.05 to 2% by weight of the composition of a mercaptosilane having the formula $R_3SiZ$ wherein at least one R is a mercapto-substituted organic radical attached to silicon through a Si—C linkage and the other R's are alkyl, aralkyl, alkaryl, alkoxy, aryloxy, cycloalkoxy, aralkoxy, alkanoyloxy or halo groups and Z is

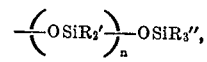

alkoxy, aryloxy, cycloalkoxy, aralkoxy, alkanoyloxy or halo groups where R' is hydrogen, hydrocarbon or a substituted hydrocarbon group nonreactive with the silane, at least one R" is an alkoxy, aryloxy, cycloalkoxy, aralkoxy, alkanoyloxy or halo groups and the remaining R"s are the same or a mercapto-substituted organic radical attached to silicon through a Si—C linkage, alkyl, aralkyl or alkaryl groups and n is 0 to 20.

The mercapto-substituted organic radical attached to silicon through a Si—C linkage is preferably a mercaptoalkyl, mercaptocycloalkyl, mercaptoalkoxyalkyl, mercaptocycloalkylalkoxyalkyl mercaptocycloalkoxyalkyl or mercaptocycloalkylalkyl radical. Typical radicals of this type include mercaptoethyl, mercaptopropyl, 1,2-dimercapto-n-butyl, mercaptoethoxyethyl, mercaptoethoxypropyl, 3 - mercaptocyclohexyl - 1 - ethyl, 2,3 - dimercaptocycloheptyl - 1 - methyl, 4 - mercaptocyclohexyl-1-methoxypropyl, etc. The alkyl and/or alkoxy groups which R, R" and Z can comprise include alkyl and/or alkoxy groups containing 1 to 10 carbon atoms such as methyl, ethyl, n-propyl, n-butyl, isobutyl, pentyl, hexyl and n-decyl, and methoxy, ethoxy, propoxy, and the like. The aralkyl, alkaryl and/or aralkoxy groups which R, R" and Z can comprise preferably contain 7 to 15 carbon atoms and are typically phenylmethyl, nonylphenylmethyl, phenylethyl, phenylbutyl, methylphenyl, ethylphenyl, nonylphenyl, phenylmethoxy, nonylphenylmethoxy, phenylethoxy and the like. The cycloalkoxy groups which R, R" and Z can comprise contain 6 to 15 carbon atoms and are typically cyclohexoxy, methylcyclohexoxy, cyclopentoxy and the like. The aryloxy groups which R, R" and Z can comprise contain 6 to 15 carbon atoms and are preferably, phenoxy, phenylphenoxy, etc. The alkanoyloxy groups which R, R" and Z can comprise contain 2 to 11 carbon atoms and are preferably acetoxy and propionyloxy. The groups which R, R" and Z can comprise are chloro, bromo, fluoro or iodo and preferably chloro. Typical hydrocarbon and substituted hydrcarbon groups which R' can comprise are alkyl, aryl, cycloalkyl, alkaryl, aralkyl, haloalkyl, haloaryl, aminoalkyl, epoxyalkyl, thioalkyl, and the like, typical examples of which are listed above with respect to the definition of R and R".

Exemplary of the preferred mercaptosilanes are mercaptoethyl trimethoxysilane,
mercaptoethyl trichlorosilane,
γ-mercaptopropyl trimethoxysilane,
1,2-dimercapto-n-butyl diethoxymethylsilane,
mercaptomethoxyethyl tribromosilane,
γ-mercaptoethoxypropyl dimethylphenoxysilane,
3-mercaptocyclohexyl-1-ethyl trimethoxysilane,
2,3-dimercaptocycloheptyl-1-methyl tripropionyloxysilane,
4-mercaptocyclohexyl-1-methoxypropyl diethoxyfluorosilane, etc.

The following examples are presented for purposes of illustration. Parts and percentages are by weight unless otherwise specified.

EXAMPLES 1–2

A water-based adhesive composition was prepared by mixing at room temperature with agitation 99.5 parts of a 55% solids, aqueous dispersion of an ethylene—vinyl acetate copolymer containing about 19 weight percent ethylene and about 81 weight percent vinyl acetate and 0.5 part of γ-mercaptopropyl trimethoxysilane. The copolymer was 60% insoluble in benzene at room temperature and was in the form of particles having an average size of 0.5 to 1.0 micron.

The above adhesive composition was next applied as a coating to a substrate of polypropylene foam (Example 1) or polypropylene film (Example 2) using a Meyer Rod to give a coating of 2 mil wet thickness and the so-coated substrates air dried at 25° C. for 15–20 minutes. Laminates were then produced by contacting the coated substrate with an uncoated substrate of paper (Example 1) or polypropylene film (Example 2) and heat sealing the composite at 225° F. for 3 seconds at 10 p.s.i. Peel strengths of the laminates were then determined by T-peel 90° according to ASTM D–187L using a draw rate of 10 inches per minute. The bond strength of the laminates of the examples are tabulated below in Table I and compared with controls prepared in the same manner except that the adhesive composition did not contain the γ-mercaptopropyl trimethoxysilane.

TABLE I

| Example No.: | Peel strength (grams/inch) |
|---|---|
| 1 | 350 |
| Control | 100 |
| 2 | 150 |
| Control | 25 |

EXAMPLES 3–14

The general procedure of Examples 1 to 2 was repeated using various substrates except that in these examples a 1 mil coating of adhesive was applied to each of the substrates of the composite, and in the case of rigid structures, bonding was achieved by compressing the composite at 10 p.s.i. and then heating at 255° F. for 5 minutes. Peel strength of the laminates of Examples 3 to 8 was determined according to ASTM D–187L (at a draw rate of 10 inches per minute) and of Examples 9 to 14 according to ASTM D–903 (at a draw rate of 12 inches per minute). The adhesive compositions used in these examples were prepared in the manner of Examples 1 to 2, the compositions containing 0.5 or 2.0% by weight of the total composition of γ-mercaptopropyl trimethoxysilane. The strength of the laminates of these examples are tabulated below in Table II and compared with controls prepared in the same manner except that the adhesive composition did not contain any γ-mercaptopropyl trimethoxylsilane.

TABLE II

| Example No. | Substrates [1] | Bond strength (grams/inch) A[2] | B[2] | Control |
|---|---|---|---|---|
| 3 | PET film/PET film | 320 | 107 | ([3]) |
| 4 | Nylon film/nylon film | 800 | | 18 |
| 5 | PE film/PE film | 120 | | 59 |
| 6 | Cellophane/Cellophane | 2,800 | 1,050 | 585 |
| 7 | Cellophane/PE film | 210 | 190 | 63 |
| 8 | Paper/paper | 820 | 400 | 290 |
| 9 | Nylon film/glass panel | 135 | 127 | 53 |
| 10 | PE film/glass panel | 310 | | 53 |
| 11 | Cellophane/glass panel | 1,550 | 1,120 | 430 |
| 12 | Saran/glass panel | 570 | | 230 |
| 13 | Paper/Al strip | >1,000 | 975 | 915 |
| 14 | PE film/Al strip | 180 | | 80 |

[1] PET=poly (ethylene terephthalate); PE=high density polyethylene; Al=aluminum.
[2] A—adhesive contained 0.5% of the mercaptosilane: B—adhesive contained 2.0% of the mercaptosilane.
[3] Could not be determined due to failure of adhesive to bond to substrates.

What I claim and desire to protect by Letters Patent is:

1. A water-based adhesive composition consisting essentially of a latex emulsion of a solid copolymer of vinyl acetate and about 5 to 40% ethylene, containing about 0.05 to 2% by weight of a mercaptoalkyl trialkoxy silane, based on the total weight of the composition.

2. The composition of claim 1 wherein the silane is γ-mercaptopropyl trimethoxysilane.

References Cited

UNITED STATES PATENTS

| 3,306,800 | 2/1967 | Plueddemann | 156—329 |
| 3,364,059 | 1/1968 | Marzocchi | 117—72 |
| 3,575,910 | 4/1971 | Thomas | 260—29.6 NR |
| 3,317,629 | 5/1967 | Quaal | 260—29.6 NR |

HAROLD D. ANDERSON, Primary Examiner

U.S. Cl. X.R.

117—161 UZ; 161—247; 260—8, 17 R, 17.4 ST, 29.6 NR, 29.6 T, 29.6 TA